(12) United States Patent
Lee

(10) Patent No.: US 7,292,325 B2
(45) Date of Patent: Nov. 6, 2007

(54) METHOD AND APPARATUS FOR DETERMINING ABSOLUTE ANGLE AND TORQUE WITH OPTICAL DETECTION MODULE

(75) Inventor: Jong-Hwa Lee, Seoul (KR)

(73) Assignee: Hyundai Mobis Co., Ltd., Kyunggi-do (KR)

( * ) Notice: Subject to any disclaimer, the term of this patent is extended or adjusted under 35 U.S.C. 154(b) by 340 days.

(21) Appl. No.: 11/024,412

(22) Filed: Dec. 30, 2004

(65) Prior Publication Data

US 2006/0050266 A1 Mar. 9, 2006

(30) Foreign Application Priority Data

Sep. 7, 2004 (KR) ...................... 10-2004-0071361

(51) Int. Cl.
*G01B 21/41* (2006.01)
*G01B 11/14* (2006.01)
*G01C 1/00* (2006.01)

(52) U.S. Cl. ........................ 356/138; 356/614; 356/616
(58) Field of Classification Search ...................... None
See application file for complete search history.

(56) References Cited

U.S. PATENT DOCUMENTS

| | | | |
|---|---|---|---|
| 4,900,913 A * | 2/1990 | Muro | ........................ 356/621 |
| 5,930,905 A | 8/1999 | Zabler et al. | |
| 6,285,024 B1 | 9/2001 | Pinnock | |
| 6,350,044 B1 | 2/2002 | Lea | |
| 6,450,044 B1 | 9/2002 | Eisenhauer et al. | |
| 6,466,889 B1 | 10/2002 | Schödlbauer | |
| 6,578,437 B1 | 6/2003 | Moerbe | |
| 6,587,211 B1 * | 7/2003 | Gelbart | ........................ 356/499 |
| 6,624,900 B1 * | 9/2003 | Eisenhauer et al. | ......... 356/614 |
| 6,817,528 B2 * | 11/2004 | Chen | ..................... 235/462.13 |
| 2003/0218126 A1 * | 11/2003 | Shiba | .................... 250/231.13 |

OTHER PUBLICATIONS

U.S. Appl. No. 10/748,152 to Jong-Hwa Lee et al., filed Dec. 31, 2003.
U.S. Appl. No. 10/748,151 to Jong-Hwa Lee et al., filed Dec. 31, 2003.

* cited by examiner

*Primary Examiner*—Michael P. Stafira
(74) *Attorney, Agent, or Firm*—Greenblum & Bernstein, P.L.C.

(57) ABSTRACT

The present invention relates to a method and apparatus for determining an absolute angle and torque with an optical detection module, in which the absolute angle and the torque are determined on the basis of measurements including marked waveforms at both ends of a torsion bar, relative rotation angles at both ends of the torsion bar, and revolutions per minute of the torsion bar measured with the aid of the revolution number measurement unit.

9 Claims, 3 Drawing Sheets

[FIG. 2]
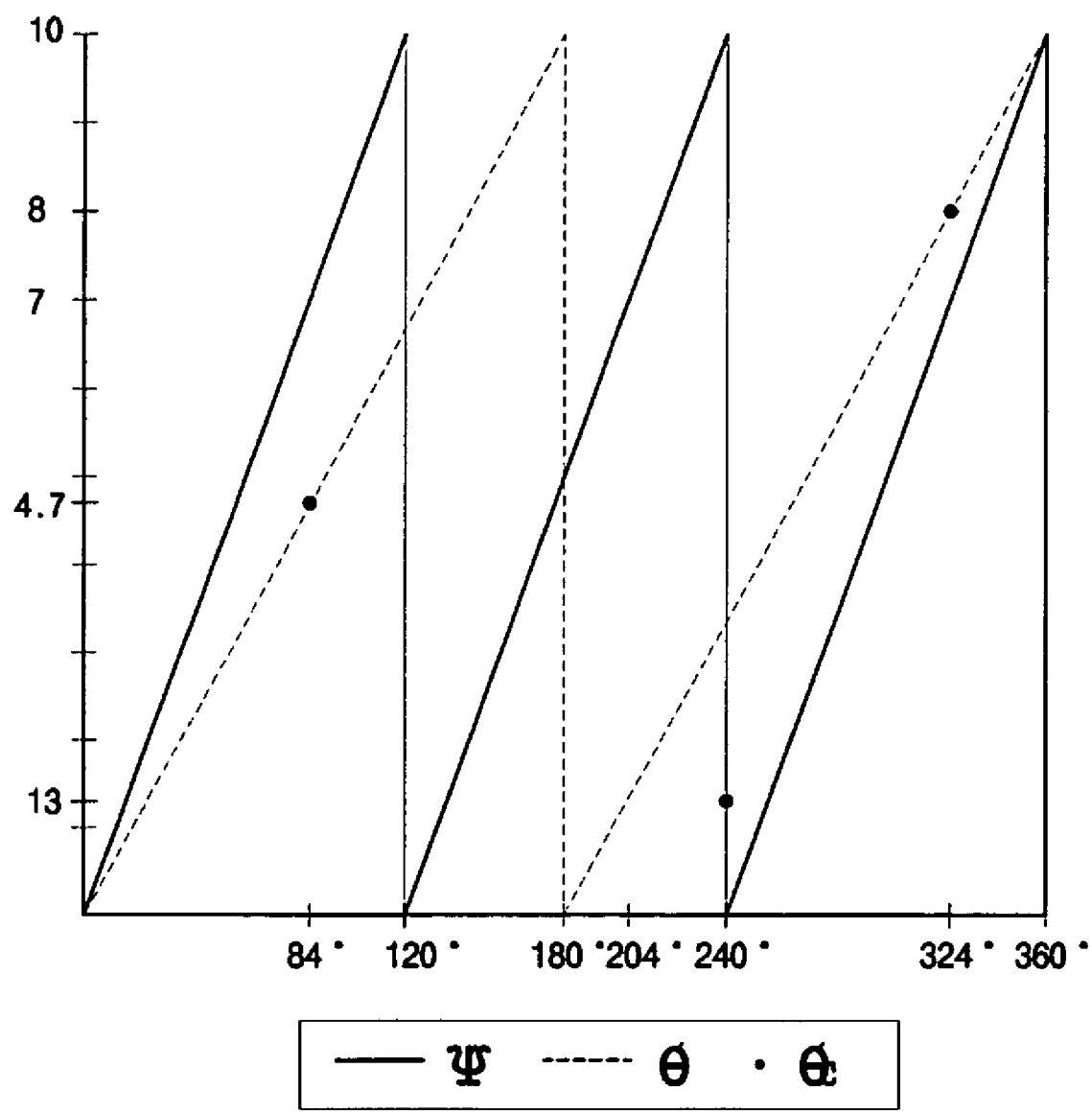

[FIG. 3]
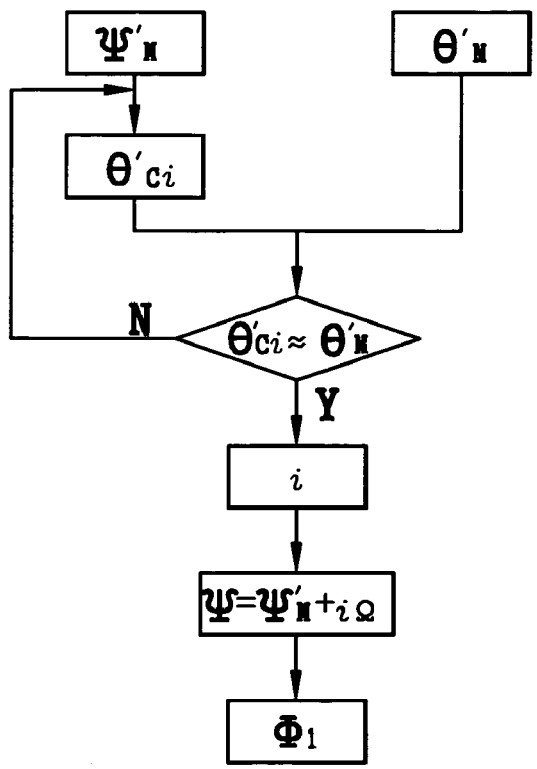
[FIG. 4]
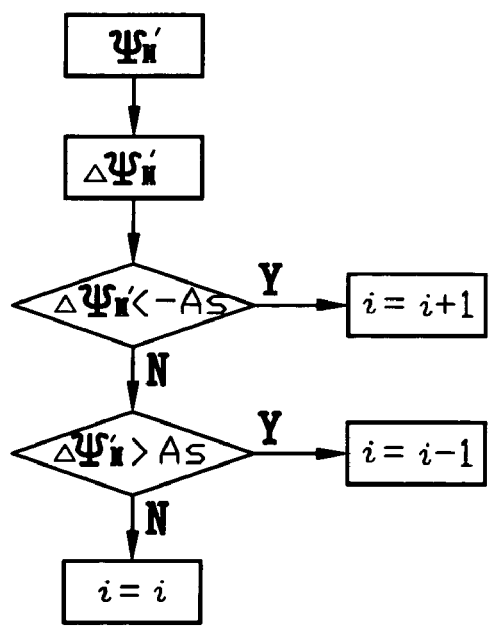

METHOD AND APPARATUS FOR DETERMINING ABSOLUTE ANGLE AND TORQUE WITH OPTICAL DETECTION MODULE

RELATED APPLICATIONS

The present disclosure relates to subject matter contained in priority Korean Application No. 10-2004-0071361, filed on Sep. 7, 2004, which is herein expressly incorporated by reference in its entirety.

BACKGROUND OF THE INVENTION

1. Field of the Invention

The present invention relates to a method and apparatus for determining an absolute angle and torque with an optical detection module, in which the absolute angle and the torque are determined on the basis of measurements including marked waveforms at both ends of a torsion bar, relative rotation angles at both ends of the torsion bar, and revolutions per minute of the torsion bar measured with the aid of a revolution number measurement unit.

2. Description of the Related Art

U.S. Pat. Nos. 5,930,905 and 6,466,889B1 disclosed methods for determining an absolute steering angle in dependence of rotation of a steering shaft. According to the disclosure, an absolute angle of the steering shaft can be determined based on measurements of rotation angle of two rotatable bodies (i.e., a first rotatable body and a second rotatable body) that rotate at a certain rotation ratio with respect to the shaft.

Suppose that absolute rotation angles of the first rotatable body and the second rotatable body are $\psi=\psi'+i\Omega$ and $\theta=\theta'+j\Omega$, respectively (wherein, '$\Omega$' denotes a measurement range of an angular sensor measuring the $\psi'$ and the $\theta'$; 'i' is an integer indicating number of times when the $\psi$ is greater than $\Omega(\psi>\Omega)$; and 'j' denotes a frequency of the second rotatable body). Both related art methods introduced an idea of determining an absolute steering angle $\phi$ of a steering shaft through a designated calculation on the measurements of $\psi'$ and $\theta'$.

Particularly, according to the method disclosed in U.S. Pat. No. 5,930,905, the measurements of $\psi'$ and $\theta'$ are substituted into a following equation (1) that is derived from a geometric relation between $\psi$, $\theta$, and $\phi$, and through rounding off, an integer (or a whole number) k is obtained.

$$k=[(m+1)\Theta'-m\psi']/\psi \qquad \text{Equation (1)}$$

The value k, $\psi'$ and $\theta'$ are substituted into an equation (2) to obtain $\phi$.

$$\phi=[m\psi'+(m+1)\Theta-(2m+1)k\Omega]/2n \qquad \text{Equation (2)}$$

In Equation (2), 'm' denotes number of gear teeth of the first rotatable body; 'm+1' denotes number of gear teeth of the second rotatable body; and 'n' denotes number of gear teeth formed on a steering shaft, in which the first and second rotatable bodies are in gear to the steering shaft.

U.S. Pat. No. 6,466,889B1, on the other hand, disclosed a method for determining a steering angle $\phi$ out of 'i' that is obtained directly from a relation between the 'i' value of the first rotatable body (or the second rotatable body) and the difference of absolute rotation angle $\psi-\theta$ of two rotatable bodies. More specifically, if the difference between the measurements of $\psi'$ and $\theta'$, i.e., $\psi'-\theta'$, is negative, $\Omega$ is added to $\psi-\theta$, but if not, the value of $\psi-\theta$ is maintained. Then, from the relation between $\psi-\theta$ and 'i', the value 'i' is calculated. Here, $\psi$ is calculated by using known values $\psi'$ and 'i'. In this manner, the absolute steering angle $\phi$. Since the measurement range of the angle sensor is $\Omega$, if the steering shaft is rotated to the maximum and thus, the value 'i' equals to 'k1', the difference of rotation angles $\psi-\theta$ should be equal to or less than $\Omega(\psi-\theta \leq \Omega)$ (in case of U.S. Pat. No. 6,466,889B1, $\psi-\theta$ was set to be equal to $\Omega$). That is, the difference of rotation angles $\psi-\theta$ continuously changes from 0° to $\Omega$ until the steering shaft rotates to the maximum, and the value 'i' changes step by step from 0 to 'k1'.

What is assumed in U.S. Pat. No. 6,466,889B1 is that the difference of rotation angles $\psi-\theta$ and the value 'i' are in linearly proportional relation to each other (i.e., when the difference of rotation angles $\psi-\theta$ continuously changes from 0° to $\Omega$, the value 'i' continuously changes from 0 to 'k1'). In effect, the value 'i' is obtained by rounding the multiplication result of k1/$\Omega$ and the $\psi-\theta$ to the nearest whole number that is less than the multiplication result. For instance, if the multiplication result of k1/$\Omega$ and the $\psi-\theta$ is 5.9, the value 'i' becomes 5.

However, the method disclosed in U.S. Pat. No. 6,466,889B1 has a limitation that a maximum value of the $\psi-\theta$ should not be greater than $\Omega$. This means that 'i-j' has to be 0 or 1 all the time, and should not be greater than 2.

Meanwhile, a torque detection device for use in automobiles typically uses a torsion bar to obtain torque. By measuring how much the torsion bar is twisted, and then the angle difference at both ends of the torsion bar, it becomes possible to calculate torque.

There are several methods for measuring the amount of twist in the torsion bar. For example, U.S. Pat. No. 6,285,024 disclosed a method for measuring an angle within 360° by transmitting a light to a rotatable body, U.S. Pat. No. 6,350,044 disclosed an analysis of a reflection pattern of a light by marking irregular, regular waveforms on a rotatable body, and U.S. Pat. No. 6,578,437 disclosed a method for determining an absolute angle and torque based on a measurement of rotation angle under the presence of a magnetic field.

Particularly, the optical detection module disclosed in U.S. Pat. No. 6,450,044 was used to measure an absolute rotation angle and torque of an electric power steering. However, because the measurement range of an angle sensor thereof was limited to 360°, another method like gear ratio reduction had to be used also. In result, measurement accuracy had deteriorated, and even a measurement device itself had a very complicated structure and shape for use.

Although a magnetic field sensor made it possible to measure an angle greater than 360°, the electric power steering (EPS) located near to a motor was too easily exposed to a magnetic field, and this increased possibility of accident occurrence.

SUMMARY OF THE INVENTION

It is, therefore, an object of the present invention to measure an absolute steering angle in a range greater than 360° by employing an optical detection module featuring high safety for measuring a relative steering angle.

It is another object of the present invention to determine an absolute steering angle and torque through simple method and high accuracy.

Still another object of the present invention is to reduce measurement errors by forming at the first and second marking units two waveforms having periods relatively prime to each other.

To achieve the above object, there is provided a method for determining an absolute angle and torque with an optical detection module, in which the method includes:

measuring with the optical detection module a first marking unit and a second marking unit formed at both ends of a torsion bar to obtain a relative rotation angle at both ends of the torsion bar, respectively; obtaining the number of revolution of the torsion bar; measuring an absolute rotation angle by using the relative rotation angles and the number of the revolution of the torsion bar; and obtaining torque by using a difference between relative rotation angles at both ends of the torsion bar.

Another aspect of the preset invention provides an apparatus that determines an absolute angle and torque with an optical detection module, the apparatus including: a torsion bar; a first marking unit and a second marking unit formed at both ends of the torsion bar, each having a relative rotation angle that is optically detectable; a revolution number measurement unit that measures the number of revolutions of the torsion bar; an optical detection module that optically detects the marking units; and a control unit that determines an absolute steering angle and torque based on the measurements.

BRIEF DESCRIPTION OF THE DRAWINGS

The above objects, features and advantages of the present invention will become more apparent from the following detailed description when taken in conjunction with the accompanying drawings, in which:

FIG. 2 illustrates a relation between ψ and θ in relation to rotation angles of a torsion bar;

FIG. 3 diagrammatically illustrates a method for determining $\phi 1$ according to the present invention; and FIG. 4 diagrammatically illustrates a method for obtaining a value of 'i' according to the present invention.

DETAILED DESCRIPTION OF THE PREFERRED EMBODIMENT

Figure 1:
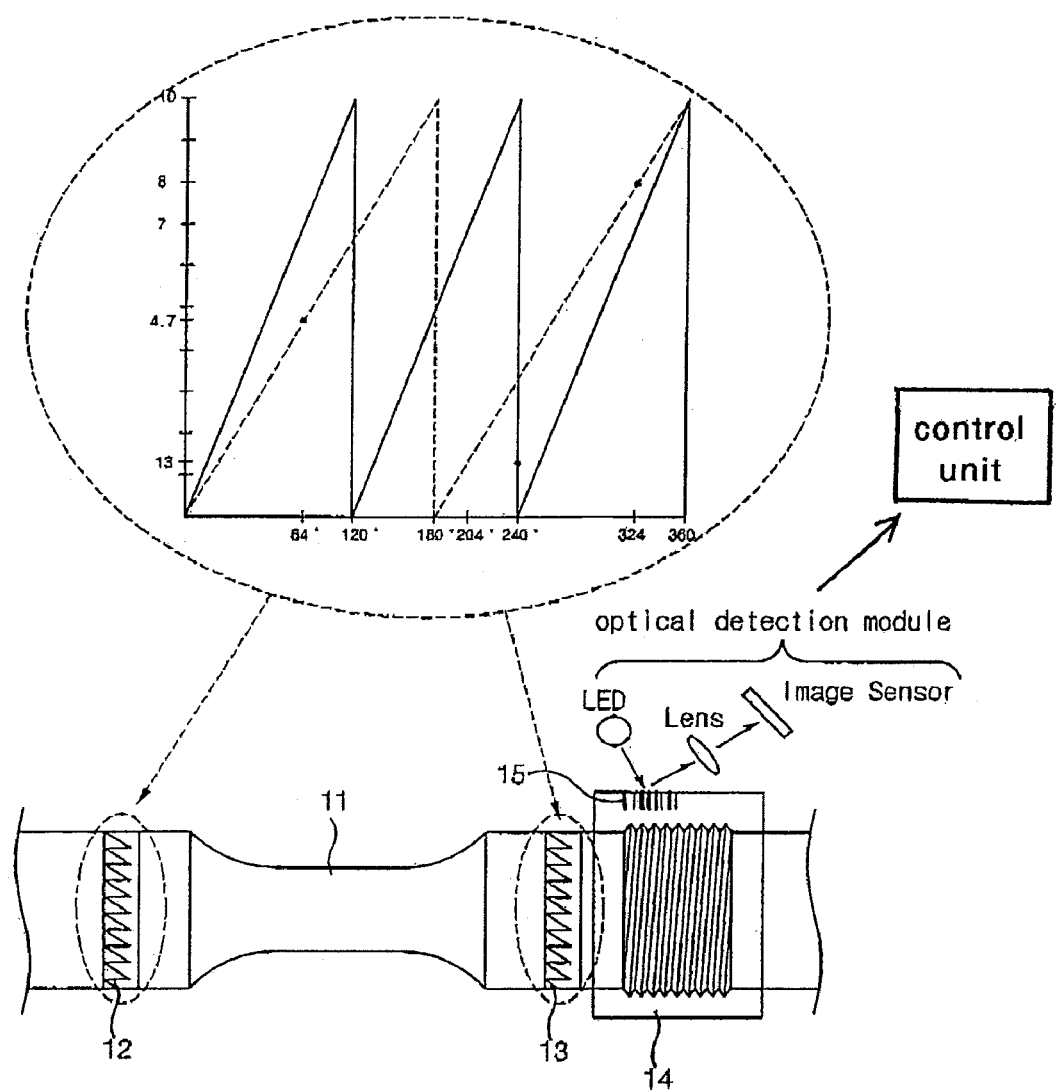
FIG. 1 illustrates an apparatus for determining an absolute angle and torque according to one embodiment of the present invention.

A preferred embodiment of the present invention will be described herein below with reference to the accompanying drawings. It should be noted that reference numerals used in the following are not necessarily identical with ones used in the description of the related art.

Referring to FIG. 1, a first marking unit 12 and a second marking unit 13 are formed at both ends of a torsion bar 11, and screw threads are formed on the right side of the second marking unit 13.

Even though any optically detectable identification mark can be marked by the first marking unit 12 and the second marking unit 13, it is preferable to make two sawtooth waveforms having periods relatively prime to each other be marked.

If an absolute rotation (or steering) angle of the torsion bar is around 360° or 720° (i.e., at a point where number of the revolution n changes), measurement errors can be serious due to the twist of the torsion bar. However, by employing two sawtooth waveforms having periods relatively prime to each other, absolute steering angle measurement errors can be reduced. More details on the method for determining an absolute steering angle with the aid of sawtooth waveforms having periods relatively prime will be provided later. In effect, it is not absolutely required to set the periods to be relatively prime. As long as the periods of waveforms are not coincident, measurement errors can be reduced. Also, other shapes of waveforms besides the sawtooth waveforms can be marked as long as the relative rotation angle can be measured with an optical detection module.

Referring back to FIG. 1, a sleeve 14 is a hollow cylinder, and screw threads are formed on an inner peripheral surface of the sleeve 14. The screw threads formed on the inner peripheral surface of the sleeve 14 can be united with the screw threads formed on the outer peripheral surface of the torsion bar 11. A barcode 15 is marked on the outer peripheral surface of the sleeve 14.

As shown in FIG. 1, the torsion bar 11 is inserted in the sleeve 14. The screw threads of the torsion bar 11 are in gear with the screw threads on the inner peripheral surface of the sleeve 14, enabling the torsion bar 11 to be rotatably mounted in the sleeve 14. Although the sleeve 14 does not rotate, it can translate in the axis direction of the torsion bar 11. When the torsion bar 11 rotates by the rotation of a steering wheel, the screw threads formed on the outer peripheral surface of the torsion bar 11 rotate as well, and torque therefrom is applied to the sleeve 14. In this case, those combined screw threads make the sleeve 14 translate horizontally along the axis direction of the torsion bar 11.

FIG. 1 illustrates one embodiment in which screw threads are formed on the outer peripheral surface of the torsion bar 11. However, it is also acceptable to form screw threads on another member that is to be coupled to an end portion of the torsion bar in such a manner that the member in question has the same axis of rotation with the torsion bar, and then to allow the sleeve 14 to be combined with such member.

The following will now explain in more detail how to determine an absolute rotation angle $\phi$ and torque T of a steering shaft in relation to the rotation of a steering wheel.

When the steering wheel rotates, the torsion bar 11 disposed on the steering shaft automatically rotates as well. When the torsion bar 11 rotates, an optical detection module senses waveforms of the first marking unit 12 and the second marking unit 13 on both ends of the torsion bar 11 to measure relative rotation angles $\phi 1$, $\phi 2$, respectively. At this time, if the torsion bar 11 is twisted, the relative rotation angle $\phi 1$ of the first marking unit 12 can be different from the relative rotation angle $\phi 2$ of the second marking unit 13. The measurement range of the rotation angles $\phi 1$ and $\phi 2$ is from 0° to 360°. In other words, if the torsion bar rotates once, the first marking unit 12 and the second marking unit 13 return to their original positions.

The number of the revolution, n, of the torsion bar 11 is measured by optically detecting a third marking unit 15 formed on the outer peripheral surface of the sleeve 14. As the torsion bar 11 rotates, the sleeve 14 moves along the axis direction. At this time, the motion of the sleeve 14 is measured to obtain the number of the revolution, n.

To see how the optical detection in FIG. 1 is carried out, it is necessary to measure the motion of the marking unit. In general, a light from an LED is reflected by the marking unit, passes through a lens, and is converged on an image sensor. Through this procedure, the motion of the marking unit is measured.

Substituting the relative rotation angles, $\phi 1$ and $\phi 2$, at both ends of the torsion bar, and the number of the revolution, n, of the torsion bar into the equations (1) and (2), it is possible to obtain an absolute rotation (steering) angle Z at both ends of the torsion bar.

$$Z1 = \phi 1 + (360° * n) \qquad (1)$$

$$Z2=\phi2+(360°*n) \quad (2)$$

Either Z1 or Z2 can be selected as the absolute steering angle, or an average of two angles can be selected as well.

Sometimes, the torsion bar is twisted during rotation. This results in the difference between the relative rotation angle measured by using the first marking unit and the relative rotation angle measured by using the second marking unit. The angle difference is used to obtain torque, T, as follows:

$$T=GI/1\times\Delta\phi(\Delta\phi=\phi1-\phi2) \quad (3)$$

The following will now explain about a method for determining an absolute steering angle by using sawtooth waveforms whose periods are relatively prime.

Suppose that height of a sawtooth waveform of the first marking unit is $\psi$, and height of a sawtooth waveform of the second marking unit is $\theta$. Here, the $\psi$ and the $\theta$ are measured with the aid of an optical sensor. Also, suppose that directly measured heights of sawtooth waveforms are $\psi_M$ and $\theta_M$, respectively, and a maximum height of a sawtooth waveform is $\Omega$. And, a value of 'i' is a whole number representing a period value of the first marking unit, that is, how many times the sawtooth waveform is repeated. Likewise, a value of 'j' is a whole number representing a period value of the second marking unit. In other words, the values of 'i' and 'j' indicate at what place the sawtooth is.

With the aid of an optical sensor, $\psi_M$ and $\theta_M$, the measurements of the $\psi$ and the $\theta$ are first obtained. Then, from the relation between the $\psi$ and the $\theta$, a plurality of $\theta$s corresponding to the $\psi_M$ are calculated to obtain their calculation values, $\theta$cs. By comparing the $\theta$cs to the $\theta_M$, the period value 'i' of the first marking unit is obtained. Then, using the value of 'i', the height $\psi$ of the sawtooth waveform of the first marking unit is obtained. From the relation between the $\psi$ and the $\theta$, the relative rotation angle $\phi1$ of the first marking unit can be determined.

It is one optional way for obtaining the period value 'i' of the first marking unit by going through the above-described procedure every time the relative rotation angle $\phi1$ of the first marking unit is obtained based on the measurements of $\psi_M$ and $\theta_M$. However, a preferable way to obtain a present value of 'i' is to follow the above procedure until the value of 'i' is obtained. Then, based on the comparison between a previous $\psi_M$ value and a present $\psi_M$ value, 1 is either added to or subtracted from a previous 'i' value. This is possible because the absolute value of $\psi_M$ changes from $\Omega$ to 0 at the moment when the 'i' value is increased by 1. In similar way, at the moment when the 'i' value is decreased by 1, the absolute value of $\psi_M$ changes from 0 to $\Omega$. That is, the absolute value of $\psi_M$ changes in a large degree during the change in the 'i' value. The benefit of this process is that the amount of calculation is decreased, and especially, a possible measurement error included in the $\theta_M$ does not influence on the value 'i'.

More preferably, from the relation between $\psi$ and $\theta$, a plurality of $\psi_S$ corresponding to the $\theta_M$ are calculated to obtain their calculation values, $\psi$cs. By comparing the $\psi$cs to the $\psi_M$, the period value, j, of the second marking unit is obtained. Then, the height $\theta$ of the sawtooth waveform of the second marking unit can be obtained by using the 'j' value, and a relative rotation angle $\phi2'$ of the second marking unit is additionally obtained from the relation between the $\theta$ and the $\phi2$. It is also possible to obtain a value of $\phi1'$ corresponding to the $\psi$M.

Here, the $\phi1$ and the $\phi2$ are relative rotation angles obtained based on the 'i' value, and the $\phi1'$ and the $\phi2'$ are relative rotation angles obtained based on the 'j' value. If the speed of calculation process is more important, the absolute steering angle or torque can be determined simply out of the $\phi1$ and the $\phi2$. If the accuracy is more important, however, it is better to use an average of the $\phi1$ and the $\phi1'$, and of the $\phi2$ and the $\phi2'$.

Because the $\phi1$ and the $\phi2$ are relative rotation angles at both ends of the torsion bar, the absolute rotation angle Z is obtained by adding to the relative rotation angle a multiplication result of a period value, n, and 360°, as shown in equations (1) and (2). One of the absolute rotation angles, or average thereof can be selected as steering angle, $\phi$, of the steering shaft.

Needlessly to say if there is no measurement error, $\phi1$ and $\phi1'$ will be the same, but if there is an error, they will have different values. This is also true for $\phi2$ and $\phi2'$. If there is neither measurement error nor twist of the torsion bar, $\phi1$, $\phi1'$, $\phi2$, and $\phi2'$ will have the same value.

As for obtaining a present value of 'j' per measurement, it is preferable to compare a previous value of $\theta_M$ and a present value of $\theta_M$, and based on the comparison result, 1 is added to or subtracted from a previous value of 'j'. This procedure is pretty much same with the procedure used for obtaining the value of 'i'. These 'i' and 'j' values are then used for obtaining $\phi1$ and $\phi1'$, and $\phi2$ and $\phi2'$. If a difference between $\phi1$ and $\phi1'$, and a difference between $\phi2$ and $\phi2'$ are greater than a certain value, $\psi$c and $\theta$c are calculated and then compared with $\psi_M$ and $\theta_M$, to reobtain 'i' and 'j' values.

The following will explain in more details in the embodiment using sawtooth waveforms shown in FIG. 2.

FIG. 2 illustrates sawtooth waveforms marked by the first and second marking units, respectively. The x-axis denotes rotation angles of marking units, and the y-axis denotes heights of sawtooth waveforms. As shown in FIG. 2, suppose that the first marking unit marked a sawtooth waveform having three periods, and the second marking unit marked a sawtooth waveform having two periods. This means that when the torsion bar rotates 360°, the sawtooth waveform appears three times at the first marking unit, and twice at the second marking unit.

Here, the best way to obtain the relation between the relative rotation angle of the first marking unit and the relative rotation angle of the second marking unit is to measure the height $\psi$ of the sawtooth waveform of the first marking unit and the height $\theta$ of the sawtooth waveform of the second marking unit during the rotation of the torsion bar.

As shown in FIG. 3, after obtaining $\psi_M$ and $\theta_M$ with the aid of an optical sensor, a plurality of $\theta$cs corresponding to the $\psi_M$ can be obtained by using the relation depicted in FIG. 2 ($\theta$ci in FIG. 3 indicates $\theta$c corresponding to 'i'). Then, the most approximate value to the $\theta_M$ among the $\theta$cs is used to obtain a value of 'i'.

For example, suppose that a maximum height $\Omega$ of the sawtooth waveform is 10, and an actual height measurement $\psi_M$ of the sawtooth waveform of the first marking unit is 7. Its corresponding $\theta$cs are 4.7, 1.3, and 8 as the value of 'i' increases from 0 to 2. Here, if the $\theta_M$=1.5, the most approximate $\theta$ci value becomes 3, and i=1. The corresponding relative rotation angle $\phi1$ of the first marking unit is 204°.

And, $\phi2$ corresponding to 1.5 is 207°.

Although it is perfectly acceptable to obtain a value of 'i' using the above-described procedure for every measurement, given that the value of 'i' is once obtained, it is more preferable to get the value of 'i' by adding 1 to or subtracting 1 from the previous 'i' value on the basis of the comparison between a previous $\psi_M$ value and a present $\psi_M$ value. For instance, if $\Delta\psi_M$ (present $\psi_M$–previous $\psi_M$) is less than a certain negative value, 1 is added to the previous 'i' value, if $\Delta\psi_M$ is greater than a certain positive value, 1 is subtracted from the previous 'i' value, and if neither, the previous 'i' value is kept to obtain the present 'i' value.

The above-described procedure is more detailed in FIG. 4. As shown in FIG. 4, if $\Delta\psi_M$ is less than –As, 1 is added to the previous 'i' value, if $\Delta\psi_M$ is greater than As, 1 is subtracted, and if neither, the previous 'i' value is kept to obtain the present 'i' value.

By using the present 'i' value and the present $\psi_M$ value, it becomes possible to obtain a present value of $\phi 1$.

As a plurality of θcs are calculated from the $\psi_M$ to obtain the value of 'i', a plurality of ψcs are calculated from $\theta_M$ to obtain the value of 'j'. Also, the present value of 'j' can be obtained by comparing the previous $\theta_M$ with the present $\theta_M$. And, the relative rotation angle $\phi 2'$ of the second marking unit can be derived therefrom.

Even though it is acceptable to use one of $\phi 1$ and $\phi 1'$ as the relative rotation angle of the first marking unit, it is more preferable to get an average of two values to reduce measurement errors. This principles equally applies to the relative rotation angle of the second marking unit.

When the relative rotation angle of the first marking unit and the relative rotation angle of the second marking unit are determined, it is possible to obtain a steering angle of the steering shaft based on the relative rotation angles.

The relative rotation angle of the first marking unit is a relative angle for observing intension of a driver, and the relative rotation angle of the second marking unit can be calculated from an actually rotated angle. If necessary, one of two values, or an average of two values can be selected as the relative rotation angle.

Then, a (n×360°) (n is number of the revolution obtained through a sleeve) is added to the relative rotation angle in order to obtain an absolute rotation angle. Thusly obtained absolute rotation angle becomes an absolute steering angle of the steering shaft.

Meanwhile, if the difference between difference between $\phi 1$ and $\phi 1'$, and the difference between $\phi 2$ and $\phi 2'$ are greater than a certain value, it means that measurement errors are too great to be acceptable. In this case, the values of 'i' and 'j' need to be obtained again following the procedure shown in FIG. 3 to get $\phi 1$ and $\phi 2$, and $\phi 1'$ and $\phi 2'$. Later, these values are averaged to obtain a preferable steering angle.

In conclusion, the present invention has the following benefits.

First, since the rotation angle is measured with the aid of an optical detection module, safety of measurement is increased.

Second, number of the revolution is obtained by using the sleeve. Thus, it becomes possible to measure an absolute rotation angle greater than 360° while measuring a relative rotation angle with the optical detection module.

Third, by allowing the first and second marking units to mark waveforms whose periods are relatively prime, it becomes possible to reduce rotation angle measurement errors.

Fourth, if the value of 'i' is obtained once, there is no need to go through the full procedure again to obtain the present value of 'i'. Instead, by comparing the previous $\psi_M'$ value with the present $\psi_M'$ value, the present value of 'i' can be derived, resulting in reducing the amount of calculation. The same principle is equally applied to the value of 'j'.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for determining an absolute angle and torque with an optical detection module, comprising:
   measuring with the optical detection module a first marking unit and a second marking unit formed at ends of a torsion bar to obtain a relative rotation angle of each end of the torsion bar;
   obtaining a number of revolutions of the torsion bar;
   determining an absolute rotation angle based on a relative rotation angle and the number of revolutions of the torsion bar;
   obtaining a torque value using a difference between the relative rotation angles of the ends of the torsion bar; and
   storing the torque value in a control unit.

2. The method according to claim 1, wherein waveforms marked by the first and second marking units at the ends of the torsion bar have periods that are relatively prime.

3. The method according to claim 1, wherein the number of revolutions of the torsion bar is obtained by using a sleeve that moves along an axis direction during rotation of the torsion bar, and comprises a third marking unit formed at an outer peripheral surface of the sleeve, and the third marking unit is measured with the optical detection module.

4. The method according to claim 2, wherein the number of the revolutions of the torsion bar is obtained by using a sleeve that moves along an axis direction during rotation of the torsion bar, and comprises a third marking unit formed at an outer peripheral surface of the sleeve, and the third marking unit is measured with the optical detection module.

5. An apparatus that determines an absolute angle and torque with an optical detection module, comprising:
   a torsion bar;
   a first marking unit and a second marking unit formed at ends of the torsion bar, each having a relative rotation angle that is optically detectable;
   a revolution number measurement unit for measuring a number of revolutions of the torsion bar;
   an optical detection module that optically detects the marking units; and
   a control unit that determines an absolute steering angle and torque based on the measurements.

6. The apparatus according to claim 5, wherein the revolution number measurement unit comprises:
   a sleeve that moves along an axis direction during rotation of the torsion bar; and
   a third marking unit marked on an outer peripheral surface of the sleeve.

7. The method according to claim 1, wherein the absolute rotation angle is determined based on the equation $Z=\phi+(360°*n)$, where Z is the absolute rotation angle, $\phi$ is a corresponding relative rotation angle, and n is the number of revolutions of the torsion bar.

8. The apparatus according to claim 6, wherein the sleeve is screwed on the torsion bar.

9. The apparatus according to claim 6, wherein the sleeve moves in an axial direction of the torsion bar when the torsion bar rotates.

* * * * *